Figure 1:
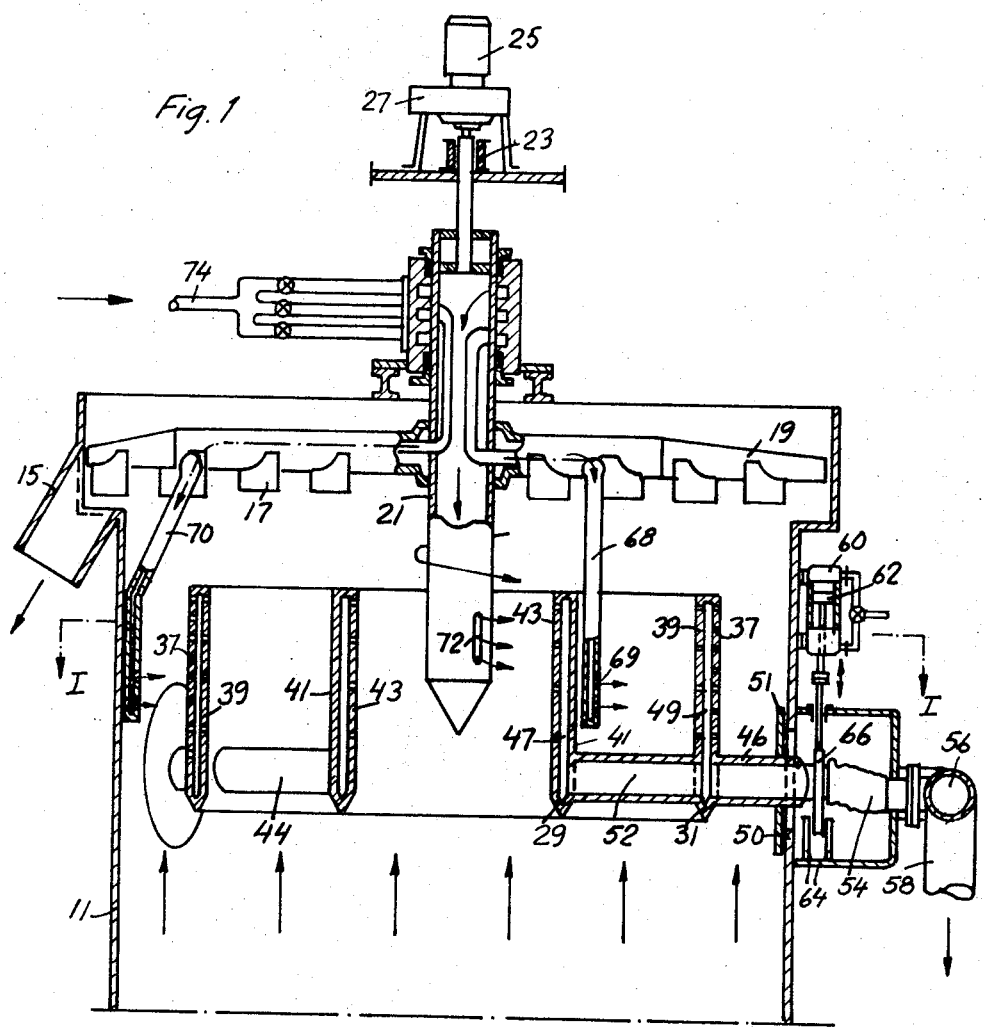

United States Patent [19]
Johansen

[11] 3,760,948
[45] Sept. 25, 1973

[54] STRAINER DEVICE IN VESSELS FOR TREATING CELLULOSIC PULP

[75] Inventor: Rolf J. Johansen, Karlstad, Sweden
[73] Assignee: Kamyr AB, Karlstad, Sweden
[22] Filed: Jan. 31, 1972
[21] Appl. No.: 221,957

[30] Foreign Application Priority Data
Feb. 2, 1971 Sweden.............................. 1245/71

[52] U.S. Cl. ............................... 210/342, 210/456
[51] Int. Cl. ............................................ B01d 29/42
[58] Field of Search................... 210/315, 342, 456, 210/487

[56] References Cited
UNITED STATES PATENTS
3,524,551  8/1970  Richter .............................. 210/342
3,216,571  11/1965  Whiting et al. ................. 210/456 X
3,278,036  10/1966  English .......................... 210/342 X
3,563,891  2/1971  Richter ........................... 210/342 X Primary Examiner—Frank A. Spear, Jr.
Attorney—Cushman, Darby & Cushman

[57] ABSTRACT

A standing cylindrical vessel for treating cellulosic pulp continuously fed therethrough, is provided with concentric strainer bodies having cylindrical faces and with rotary spray tubes having outlets for spreading a liquid in the pulp in circular paths between the strainer bodies. Liquid ejected through said outlets moves transversely of the pulp flow towards the strainer faces where liquid is withdrawn from the pulp. An impervious cylindrical wall or screen is located close to a liquid outlet moving between two strainer bodies and obstructs the flow therefrom in such a manner that the liquid flows merely or mainly towards one of said strainer bodies.

7 Claims, 2 Drawing Figures

STRAINER DEVICE IN VESSELS FOR TREATING CELLULOSIC PULP

The invention relates to a strainer device in such vessels for treating fibrous material, particularly cellulosic pulp, as are adapted for maintaining an axially directed flow of the fiber material suspended in a liquid, said device comprising a set of concentric strainer bodies located at the same level and having substantially vertical cylindrical strainer faces for withdrawal of liquid from the pulp, as well as outlets for distributing a liquid in the pulp, which outlets are placed in the pulp on approximately the same level as the strainer faces and moveable in circular paths concentric to the strainer faces.

In such a device a transverse flow of liquid can be maintained through the pulp flowing axially in the vessel. The object of said transverse flow may be to replace the liquid in which the cellulosic fibers are suspended, by another liquid, e.g., to replace liquor or any other treating liquid by a cleaner liquid such as water, i.e., to wash the pulp, or to replace the earlier suspension liquid with treating liquid or with an other or a stronger treating liquid in order to impregnate the pulp therewith.

In known embodiments of the above-mentioned device, such liquid outlets as are placed in the space between two strainer bodies distribute the liquid in opposite directions, viz. in the direction towards the strainer face lying on a greater radius as well as in the direction towards the strainer face lying on a smaller radius than the outlet. However, it has proved difficult to have the liquid distributed in the two directions in proper proportions, the liquid usually flowing easier in the direction radially outwards towards the outer, greater strainer face. To counteract this effect it has been suggested to place the outlet slightly closer to the radially inner than to the outer strainer face, but said solution has not given a satisfactory result.

According to the present invention said difficulty is eliminated by placing the liquid outlet moveable between two strainer bodies, in a position close to an impervious cylindrical screen rigidly connected to the strainer bodies, whereby the liquid ejected from said outlet is diverted merely towards one of said two strainer bodies.

Figure 2:
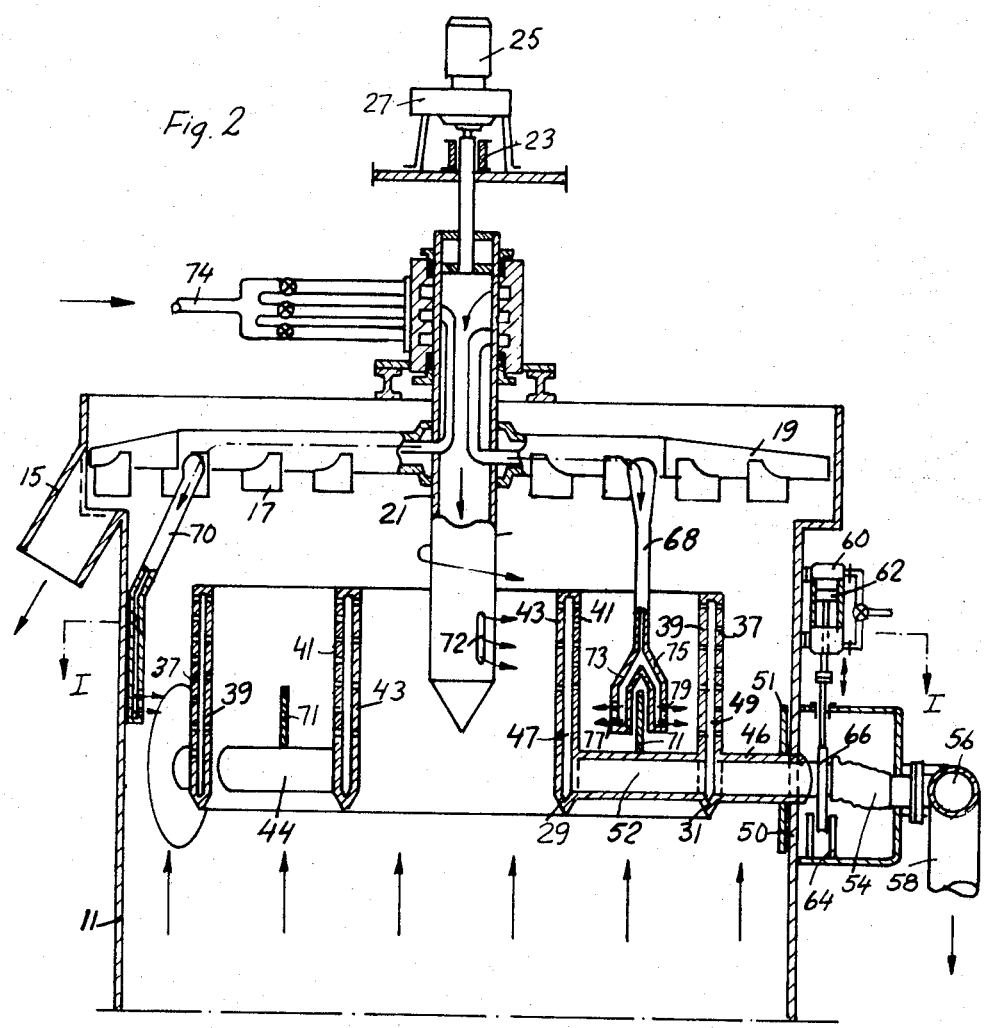

The invention will be more closely described herein below with reference to the accompanying drawings, in which FIGS. 1 and 2 are vertical cross-sectional views of two embodiments of a device according to the invention.

Referring to FIG. 1, 11 designates the shell consisting of sheet steel or concrete, of an upright cylindrical vessel which preferably is adapted for the performance of some kind of treatment of pulp consisting of a suspension of cellulosic material in a liquid. The vessel may form a digester for wood chips, straw or other finely comminuted fiber material or a bleaching tower for digested and defibrated cellulosic pulp of a more or less dense consistency. Also, the vessel may be adapted exclusively for the performance of a pulp washing operation or a raise of the pulp consistency by withdrawal of part of the liquid contents therefrom. The vessel is arranged to be passed by the fiber material in the direction from below upwards either fully continuously or intermittently with smaller or greater, periodically supplied batches. To said end the vessel is provided at its bottom (not shown) with charging devices for causing the material to move vertically upwards through the vessel. Arranged at the upper end of the vessel is a discharging device which conveys the rising material out through a lateral outlet 15. Said discharging device may consist of a scraper composed of obliquely set plates 17 carried by radial arms 19 attached to a rotary, vertical shaft 21. Said shaft is located centrally in the vessel and the upper end thereof is journalled in a bearing 23 and driven by a motor 25 with a gear 27. If desired, the vessel may be closed at the upper end and maintained under over-pressure.

The straining device mainly consists of two annular strainer bodies 29, 31 concentric to each other and to the axis of the vessel, said strainer bodies being located at essentially the same level. Each strainer body is composed of two substantially cylindrical plates 37, 39 and 41, 43 respectively, having slightly different diameters which plates are inserted into each other and united at their upper and lower edges. The distance between the plates is considerably less than their axial extension and chosen with regard merely thereto that the space between the plates should allow free flow of the liquid strained off and with regard to mechanical strength and rigidity. Thus, in a radial cross-section the strainer body forms an area elongated in the vertical direction and having pointed or rounded ends in order to oppose as little as possible the movement relatively to the pulp in the axial direction. The plates 37, 39, 41, 43 are substantially vertical everywhere. The plates 37, 39; 43 are shaped as strainer plates having perforation apertures or vertically extending strainer slits over essentially the entire area, whereas the plate 41 is impervious. However, at their lower portions all plates are preferably made impervious, so that the withdrawn liquid can be collected in the lower parts of the cavities 47, 49 of the strainer bodies. The strainer bodies are situated at radial distances from the axis of the vessel so chosen that the withdrawal of liquid becomes fairly evenly distributed over the cross-sectional area of the vessel.

The strainer bodies are rigidly attached to horizontal and radial carrying arms 44, 46, the outermost ends of which extend through slots 50 in the shell of the vessel, said slots being sufficiently long to allow a restricted vertical reciprocation of the carrying arms. Cover plates 51 attached to the carrying arms cover said slots and reduce the leakage therethrough. The carrying arms are tubular and their interior cavities 52 communicate with the cavities 47, 49 within the strainer bodies and also communicate via separate hose connections 54 to an exterior header 56 and a common discharge conduit 58 through which departs the liquid withdrawn from the pulp by the strainer bodies 29, 31.

The strainer bodies are arranged to be raised and lowered by means of an operating device provided outside the vessel and arranged to act upon the projecting ends of the carrying arms 44, 46. For each carrying arm there is attached to the outside of the vessel a hydraulic or pneumatic cylinder 60 with a vertically displaceable piston 62 connected to a fitting 66 surrounding the end of the carrying arm. Pressure fluid is supplied simultaneously to the upper ends of the three cylinders 60 so that the carrying arms are forced uniformly downwards and displace the strainer bodies axially. Said movement takes place comparatively rapidly, the lower pointed edges of the strainer bodies being forced down through the pulp. Due to the rapid relative motion of the strainer faces and the pulp, fibers that may have been partly sucked into the strainer apertures choking the same are worked loose. If desired, the discharge conduit 58 may be provided with a valve which is being closed simultaneously with the said downward movement of the strainer bodies and which shuts off the pressure difference between the two sides of the strainer plates, thereby releasing the pulp stuck to the strainer faces so that the latter can be moved and placed opposite a new pulp layer. When the strainer bodies have been brought into their lowermost end position, the pressure fluid is shut off so that the pistons can move freely upwardly. During the continued rise of the pulp in the vessel the pulp brings the strainer bodies with it on account of the friction between the pulp and the strainer faces due to the pressure differential and therefore the straining takes place practically without any slip between the pulp and the strainer bodies. Of course, the slow lift of the strainers may be aided by the hydraulic or pneumatic operating device, if and when that proves to be advantageous.

Of course, the number of carrying arms may vary and merely one or a few of them need be hollow and serve for discharging the withdrawn liquid.

The device for spreading liquid into the pulp, which liquid herein is termed "wash liquid" but which may instead consist of a bleaching liquid or other chemical treating liquid, comprises vertically extending spray tubes 68, 70 suspended from the arms of the scraper 19, and an outlet opening 72 upon the prolonged lower end of the shaft 21. Wash liquid from a conduit 74 is supplied through separate connections which may be controlled by valves and which are provided in the shaft 21 and the scraper arms and connected to the spray tubes 68, 70 and the outlet opening 72. The ejection apertures of the spray tubes 68, 70 as well as the aperture 72 are situated approximately at the same level as the upper parts of the strainer bodies, so that the wash liquid and the liquid displaced thereby move essentially in the horizontal direction towards the strainer faces, i.e., transversely to the upwardly fed pulp, the movement of the latter thus being merely insignificantly influenced by said transverse liquid flow. The spray tubes 68, 70 are of a cross-section that is oblong or stream-lined in their direction of motion, the load upon the motor 25 consequently being low and the agitation of the pulp being kept small.

According to the invention, the spray tube 68 located between the strainer bodies 29, 31 is placed at such a radial distance from the axis that it moves close to the inner strainer body 29. As mentioned, the neighbouring cylindrical wall 41 of said strainer body is impervious, said wall forming a screen preventing the liquid ejected from the outlet apertures 69 upon the spray tube 68 from spreading in more than one radial direction. The path to the strainer apertures on the other side of the strainer body 29 is too long, and therefore the liquid ejected into the pulp moves entirely in the direction towards the strainer face 39 of the outer strainer body 31. For each of the three part flows in which the axially flowing pulp is divided up by the strainer bodies 29, 31, the same condition applies, i.e., the transverse liquid current moves in the same direction through the entire part pulp flow, namely radially outwards in respect of the innermost and the middle part flow, whereas the liquid flow is directed radially inwards through the outermost part pulp flow passing between the vessel shell 11 and the strainer body 31.

In the embodiment of FIG. 2, where the same reference numerals have been applied to the same details as in FIG. 1, the wall 41 of the strainer body 29 is shaped as a strainer face, and the inventive effect is provided by a cylindrical screen, shield or partition 71 placed approximately midway between the strainer bodies 29, 31 and concentric thereto. In comparison to FIG. 1, there is also the difference that the spray tube 68 is located approximately midway between the strainer faces 39, 41. The lower end of the spray tube 68 is branched into two branches 73, 75 situated in the same radial plane and projecting downwardly on opposite sides of the screen 71. Thus, the tube branches embrace the screen as a fork, and at a level coinciding approximately with the middle portion of the strainer faces 39, 41 they are provided with ejection nozzles or outlets 77, 79. The screen 71 forms an obstruction for the free spreading of the liquid ejected through the outlet 77, which forces the liquid to move radially inwards towards the strainer face 41. Similarly the screen forms an obstruction for the liquid ejected through the outlet 79 diverting the same radially outwards towards the strainer face 39.

The invention has been described above as applied to a known vessel for washing of cellulosic pulp, but the invention is not restricted thereto but may also be applied to vessels adapted for some other treatment of pulp and having another design of strainer bodies and liquid spreading means.

What is claimed is:

1. Strainer device in a standing cylindrical vessel adapted for maintaining an axial flow of pulp consisting of fiber material suspended in a liquid, said device comprising a set of concentric hollow stainer bodies placed at the same level and having essentially vertical strainer faces for withdrawing liquid from the pulp simultaneously into each strainer body, and outlets for spreading of liquid in the pulp located at approximately the same level as the strainer faces and moveable in paths concentric thereto, a liquid outlet moveable between two strainer bodies being located closer to an impervious cylindrical screen attached to the strainer bodies than an opposite pervious wall in one of said strainer bodies, in order to divert the liquid ejected from said outlet towards merely one of said two strainer bodies.

2. Device as claimed in claim 1, wherein the screen is formed by one cylindrical wall of a strainer body having strainer apertures merely in its other cylindrical wall.

3. Device as claimed in claim 1, wherein the screen is placed between and concentrically to two opposed strainer faces of neighbouring strainer bodies, and two liquid outlets are placed on opposite sides of the screen so that from the vicinity of the screen there depart liquid flows in opposite radial directions.

4. Device as claimed in claim 3, wherein a conduit for supply of liquid to the outlets comprises a vertical tube attached to a rotary shaft provided centrally in the vessel, said tube having end branches embracing and extending downwardly on opposite sides of the upper part of the screen said two liquid outlets being formed by orifices upon said branches.

5. In a vessel for cellulosic pulp, a strainer device for withdrawing liquid out of the pulp comprising at least one inner and outer concentric hollow strainer bodies, each one having an inner and an outer cylindrical wall, and means for spreading a liquid in a circular path in the space between said bodies, the improvement consisting in that the inner wall of said inner strainer body is pervious for withdrawing liquid of the pulp into the interior thereof and the outer wall of said inner strainer body is impervious, the outer strainer body having a pervious wall opposite to said impervious wall, and said means for spreading a liquid is located closer to the impervious wall than the opposite pervious wall whereby liquid of the pulp in the space between said bodies is withdrawn merely into the interior of the last-mentioned strainer body.

6. In a vessel for cellulosic pulp, a strainer device for withdrawing liquid out of the pulp comprising at least one inner and outer concentric hollow strainer bodies, each one having an inner and outer pervious cylindrical wall for withdrawing liquid of the pulp into the interior thereof and means for spreading a liquid in a circular path in the space between said inner and outer strainer bodies, the improvement comprising an impervious screen placed between and concentrically to the outer pervious wall of the inner strainer body and the inner pervious wall of the outer strainer body, and two liquid outlets are placed on opposite sides of the impervious screen so that from the vicinity of the screen, liquid flows in opposite radial directions.

7. A vessel as claimed in claim 6 wherein a conduit for supply of liquid to the outlets, comprises a vertical tube attached to a rotary shaft provided centrally in the vessel, said tube having end branches embracing and extending downwardly on opposite sides of the upper part of the impervious screen said two liquid outlets being formed by orifices upon said branches.

* * * * *